United States Patent [19]

Genovese

[11] Patent Number: 5,710,589

[45] Date of Patent: Jan. 20, 1998

[54] LASER DIODE BEAM INTENSITY REGULATION METHOD AND APPARATUS

[75] Inventor: Frank C. Genovese, Fairport, N.Y.

[73] Assignee: Xerox Corporation, Stamford, Conn.

[21] Appl. No.: 584,789

[22] Filed: Jan. 11, 1996

[51] Int. Cl.⁶ .............................. G02B 26/08; G01J 1/32; G11B 7/00

[52] U.S. Cl. ..................... 347/262; 359/196; 359/204; 359/205; 250/205; 369/116

[58] Field of Search .................................. 347/233, 236, 347/246, 258, 260, 262; 359/204, 206, 212, 216, 218, 196, 618, 629; 250/205; 369/116

[56] References Cited

U.S. PATENT DOCUMENTS

| 4,796,961 | 1/1989 | Yamada et al. | 359/218 |
|---|---|---|---|
| 4,796,964 | 1/1989 | Connell et al. | 350/6.8 |
| 5,233,175 | 8/1993 | Latta et al. | 250/205 |
| 5,550,668 | 8/1996 | Appel et al. | 359/204 |
| 5,659,414 | 8/1997 | Appel et al. | 359/196 |

*Primary Examiner*—Adolf Berhane
*Attorney, Agent, or Firm*—John M. Kelly

[57] ABSTRACT

A raster output scanner having a laser diode which generates a laser beam with a controlled beam intensity. The raster output scanner includes a time base generator which divides time into a sequence of periods; a laser diode; a current driver which applies laser excitation current to the laser diode in selected pixel periods, wherein the drive current causes the laser diode to generate a laser beam, and wherein the drive current depends upon a control input; a latent image producing surface; and a raster scanner for sweeping a focussed laser beam in scan lines across the latent image producing surface, wherein the time required to complete a scan line is a N pixel periods. The raster output scanner further includes a photosensor which receives a portion of the laser beam and which charges a capacitor with a current which depends upon the laser beam intensity in M pixel periods, wherein the M pixel periods occurs over a time span greater than N pixel periods, a comparator for comparing the voltage on the capacitor after the M pixel periods, and a correction controller for adjusting the control input such that the laser beam intensity is adjusted toward a predetermined value.

11 Claims, 4 Drawing Sheets

LASER DIODE BEAM INTENSITY REGULATION METHOD AND APPARATUS

FIELD OF THE INVENTION

The present invention relates to techniques of controlling the beam intensity of laser diodes.

BACKGROUND OF THE INVENTION

The use of laser diodes in electrostatographic printers and copiers is well known. In such systems the laser diode drive current is typically modulated in accordance with a digital representation of an image that is to be produced. The modulated drive current produces a laser beam which is intensity modulated in accordance with the digital representation. The modulated laser beam is collimated and directed onto the facets of a rotating polygon mirror which sweeps the reflected beam in a fast scan direction. The swept beam passes through a lens system which focuses the modulated laser beam on a charged photoreceptive surface in a pattern of closely spaced scan lines called rasters. By scanning the modulated laser beam in rasters, the photoreceptive surface is discharged point by point in conformance with the digital representation, producing an electrostatic latent image. As is well known in the xerographic art, a latent electrostatic image can be developed with toners to produce a visible toner image which can be subsequently fused onto a marking substrate to yield a permanent version of the desired image.

As the rate of image production increases it becomes desirable to operate several laser diodes in parallel to increase the system processing bandwidth. Individual laser diodes operating in parallel may share common optics and scanning hardware but are individually modulated with image information, and are usually arranged to form interlaced rasters on the photoreceptive surface. This approach generally requires that each laser diode have a separate, modulated current source. An example of a multiple laser diode system is disclosed in U.S. Pat. No. 4,796,964, issued on Jan. 10, 1989 to Connell et al., and entitled, "Method of Utilizing a Multiple Emitter Solid State Laser in a Raster Output Scanner (ROS)." While the use of multiple laser diodes offers speed advantage, high quality imaging requires that the individual laser diodes produce equal exposure levels at the photoreceptive surface. However, multiple laser diodes operated in parallel at the same drive current will not necessarily produce equal exposure levels at the photoreceptive surface due to variations in manufacture. Instead, laser diodes typically exhibit a distribution of lasing characteristics, with each individual device producing slightly different optical output power as a function of drive current.

Figure 1:
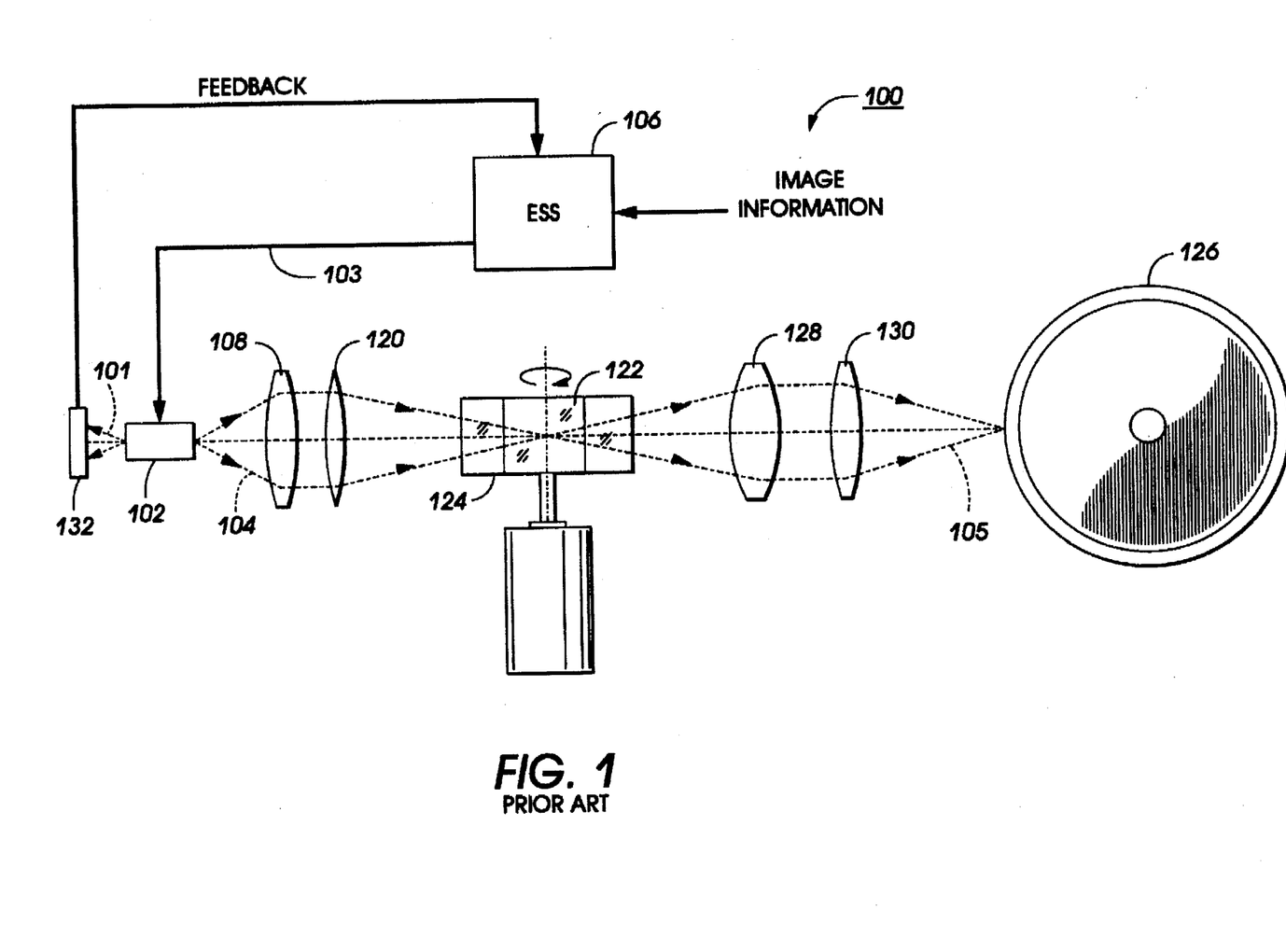
FIG. 1 schematically depicts a prior art raster output scanner.

One method of achieving equal exposures from a plurality of laser diodes is to monitor the light flux emitted from each diode and to regulate the drive current such that the power delivered by each laser diode matches a standard value. The apparatus of FIG. 1 illustrates a prior art scheme of monitoring and controlling the beam intensity of a single laser diode in a ROS system 100. Essentially, the power in beam 101 transmitted through the back facet of laser diode 102 is measured by means of detector 132, and is used to indicate the generally much greater power level of beam 104 emitted from the front facet of laser diode 102. The ratio of front to back emission can be tailored over a wide range in the manufacturing process, but is fixed for a given device and can be measured directly. While FIG. 1 shows only one laser diode 102 in a raster output scanner it is to be understood that the general scheme can be applied to systems which use a plurality of laser diodes.

As shown, laser diode 102 produces a diverging beam 104 of coherent light which is modulated in accordance with image information from an external source processed by an electronic subsystem (ESS) 106. It is to be understood that the electronic subsystem includes a current source to excite laser diode 102 in accordance with the image data by supplying current to diode 102 via conductor path 103. The image information could be from any number of external sources such as a computer, a facsimile machine, or a raster input scanner. Beam 104 is conditioned by collimating optics 108 and the cylindrical lens 120 focuses the beam 104 into a line image on one of a plurality of mirrored facets 124 on the perimeter of rotating polygon 122. The rotation of the polygon causes the beam to be swept, and thereby scanned in a sharply focussed raster pattern as beam 105 on the surface of photosensitive image member 126, shown as a photoreceptor drum. In the path between the polygon and the image member a post-polygon optical system comprised of a toroidal lens 128 and a cylindrical lens 130 conditions the swept beam 105 so that it has a substantially circular or substantially elliptical cross-section when focused on the surface of the image member 126. Additionally, the post-polygon optical system is designed to produce a linear scan of constant spot size and velocity over the length of the scan line, and also serves to eliminate image artifacts referred to as polygon wobble signature.

Still referring to FIG. 1, laser diode 102, which as noted has front and back facets, is designed such that most of the coherent laser power emitted in beam 104 is transmitted through the front facet. In operation, the fraction of the internal lasing flux transmitted through the back facet as beam 101 and detected by a photodiode 132 is directly related to the fraction of internal lasing flux transmitted through the front facet that forms beam 104. Beam 101 creates photocurrent in photodiode 132 which is applied to the electronic subsystem 106. That subsystem compares the photogenerated current with a predetermined value corresponding to the desired operating level of beam 101, and thus beam 104 by inference. If correction is required, that is, the feedback photocurrent deviates from the predetermined value, the operating current applied to the laser diode 102 via path 103 is adjusted to bring the level of the feedback photocurrent closer to the desired value. In the scheme described above, the scanning beam intensity is dynamically controlled, i.e., the output of photodiode 132 is applied to the electronic subsystem which continuously compares the feedback signal with the predetermined value and adjusts the diode excitation current accordingly.

While the ROS system 100 is functional, it is not optimal. For example, system 100 requires accurate calibration since back facet photodiode 132 detects an unspecified fraction (in the range of about 0.5%) of the total laser diode output power. The calibration uncertainty can be reduced by detecting a portion of the output beam emitted from the front facet directly, for example, by inserting a small mirror or lens to redirect unused flux emitted from the front diode facet onto a photodiode. Because multiple laser diode systems have an increased need for accurately controlled image exposure, detecting a fixed portion of the modulated flux output actually used to expose the image is very desirable.

Regulating systems employing a plurality of beam sources and detecting photodiodes require adequate optical isolation, both to prevent direct optical leakage from the multiple laser diode sources to incorrect detectors, i.e., optical crosstalk, as well as to eliminate scattered and multipath reflections of stray light from the various optical components located in the beam paths. Reference may be had to U.S. patent application Ser. No. 08/492,504 entitled, "MEANS FOR CONTROLLING THE POWER OUTPUT OF LASER DIODES IN A ROS SYSTEM," filed on Jun. 20, 1995 by Appel et al. for one method of controlling laser beam intensity using photodetectors in the beam paths in a multiple beam system.

Another problem with systems such as that depicted in FIG. 1 and described in U.S. patent application Ser. No. 08/492,504 is that the time available for detection and control of beam intensity decreases as the system throughput is increases. One may use faster, more expensive components and functional blocks to increase the measurement and response bandwidth of the power regulating circuitry. However, this may not be the optimal solution, particularly in systems in which cost is a significant factor. Furthermore, even the most expensive conventional regulating designs have an upper limit for robust operation.

Therefore, a new, accurate beam intensity control technique which can use low cost, relatively low speed components would be beneficial.

SUMMARY OF THE INVENTION

The principles of the present invention provide for the regulation of the beam intensity emitted by a laser diode in a raster output scanner.

In the descriptions that follow the letters "M," "N," and "J" represent integers.

A raster output scanner assembly according to the principles of the present invention is comprised of a time base generator which creates a sequence of machine clock periods; a laser diode for emitting a laser beam having a first portion and a second portion in response to a laser excitation current; a current drive circuit receiving a drive signal and a current control signal, the current driver is for applying excitation current to the laser diode in pixel periods activated by the drive signal input, wherein the amplitude of the laser excitation current depends on the current control input; a raster scanner for sweeping the first portion of the laser beam in scan lines, wherein the time required to complete a scan line, referred to as the scan line interval time, is equal to N pixel periods; a controller for applying a set of M drive signals to the drive circuit, wherein the set of M drive signals occurs over a number of pixel periods which is greater than N; a photosensor illuminated by the second portion of the laser beam and generating a charge current derived from the set of M drive signals and which is dependent upon the beam intensity of the second portion of the laser beam; a capacitor for receiving the generated charge current and for producing a capacitor voltage approximately proportional to the received generated charge current; a comparator for comparing the capacitor voltage with a predetermined value and for producing a comparator signal based upon that comparison, wherein the comparison occurs after the set of M pixel periods is completed; and a current control circuit for receiving the comparison signal and for adjusting the current control signal based on the comparison signal such that the intensity of the second part of the beam is changed in the direction of a predetermined intensity. Raster output scanner assemblies according to the principles of the present invention are particularly useful in electrostatographic printing machines.

A method of controlling the intensity of a laser beam exposing a photoreceptive surface according to the principles of the present invention is comprised of the steps of identifying a sequence of pixel periods; applying laser excitation current to a laser diode in a first set of selected pixel periods so as to emit a laser beam; sweeping a first portion of the emitted laser beam across a photoreceptive surface from a predetermined starting point to an ending point in a scan line interval time of N pixel periods; illuminating a photosensor with a second portion of the emitted laser beam and generating a charging current from a second set of M pixel periods, wherein the charging current is dependent upon the beam intensity of the second part of the laser beam; charging a capacitor with the generated charging current so as to create a capacitor voltage; comparing the capacitor voltage with a predetermined value after the second set of M selected pixel periods, wherein the second set of M selected pixel periods requires more than one scan line interval time to occur; and adjusting the laser excitation current such that the intensity of the second portion of the beam is changed in the direction of a predetermined intensity.

BRIEF DESCRIPTION OF THE DRAWINGS

Other aspects of the present invention will become apparent as the following description proceeds and upon reference to the drawings, in which.

DETAILED DESCRIPTION OF THE PREFERRED EMBODIMENT

The following description is presented in the context of a particular application. It is to be understood that the principles defined herein may be applied to other embodiments without departing from the spirit and scope of the present invention. Thus, the present invention is not intended to be limited to the particular embodiment shown, but is to be accorded the widest scope consistent with the principles and features disclosed herein.

Figure 2:
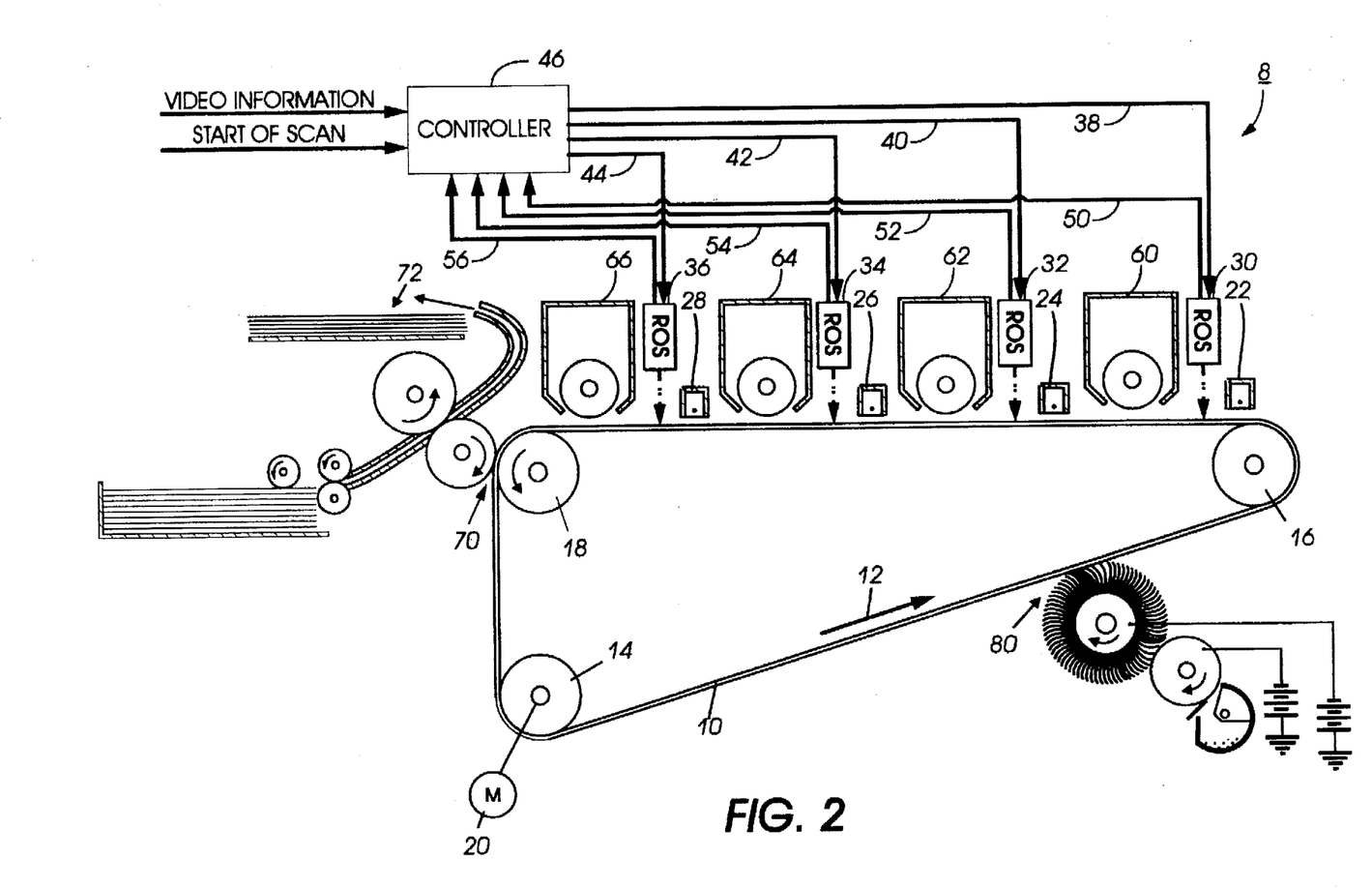
FIG. 2 schematically depicts a single pass, four color printing machine which incorporates the principles of the present invention.

FIG. 2 illustrates a single pass, four color electrophotographic printing machine 8 which incorporates the principles of the present invention. The printing machine 8 includes a charge retentive surface in the form of an Active Matrix (AMAT) photoreceptor 10 which has a photoreceptive surface and which travels in the direction indicated by the arrow 12. Photoreceptor travel is brought about by mounting the photoreceptor about a drive roller 14 and two tension rollers 16 and 18, and by rotating the drive roller 14 by means of drive motor 20.

As photoreceptor 10 is advanced by drive motor 20, each part passes through the subsequently described process stations in sequence. For convenience, sections of the photoreceptor, referred to as image areas, are identified. An image area is a part of the photoreceptor surface which is processed by the various subsystems to produce a developed image. While the photoreceptor may have numerous image areas, each is processed in the same way and a description of the processing of one image area suffices to explain the operation of the printing machine.

As the photoreceptor 10 advances, a first image area passes a first corona generating corotron 22, a second image area passes a second corona generating corotron 24, a third image area passes a third corona generating corotron 26, and a fourth image area passes a fourth corona generating corotron 28. Each of the corotrons charge their associated image areas to a relatively high and substantially uniform potential, for example about −700 volts. While the image areas are described as being negatively charged, they could be positively charged if a suitable photoreceptor is employed and the charge levels and polarities of the other relevant sections of the printing machine 8 are appropriately reconfigured. It is to be understood that power sources, which are not shown, supply the various corotrons and the other devices, which are subsequently described as required, so that they perform their intended functions.

After passing the corotrons the first, second, third, and fourth charged image areas are exposed, respectively, by laser based raster output scanners 30, 32, 34, and 36. Each of the raster output scanners is beneficially similar to the ROS system 100 illustrated in FIG. 1, except that the raster output scanners do not include an individual electronic subsystem 106. In the printing machine 8 the exposure control functions are performed in a substantially different way by a single controller 46, whose operation is described subsequently. The various raster output scanners each sweep a modulated laser beam in a sharply focussed raster line spanning their image areas in a fast scan direction as the photoreceptor 10 advances in the direction indicated by arrow 12. Each raster output scanner thereby illuminates its image area with light flux in a pattern representing one of the color separations of a full-color image. For example, raster output scanner 30 might expose the first image area with a light flux representation of a black image, the raster output scanner 32 might expose the second image area with a light flux representation of a cyan image, the raster output scanner 34 might expose the third image area with a light flux representation of a yellow image, and the raster output scanner 36 might expose the fourth image area with a light flux representation of a magenta image. The light flux representations are derived from laser excitation currents applied to the raster output scanners 30, 32, 34, and 36, via, respectively, conductor paths 38, 40, 42, and 44, from the controller 46.

The controller 46 receives and processes both image information and a start of scan signal (or signals) to produce the laser excitation currents for the various scanners. The image information is typically in the form of a digital bit stream representation of the composite image that is to be produced and can be from any of a number of sources, including a computer, a facsimile machine or a raster input scanner. Start of scan (SOS) pulses signal that the focussed laser beams have crossed predetermined starting positions along the scan lines. By decoding the digital bit stream information into laser excitation profiles, and by synchronizing the application of the laser excitation profiles of the various scanners with the positions of the laser beams as they scan across the image areas, the desired latent color separation images can be produced in registration on their respective image areas.

The controller 46 also receives and processes beam intensity information from scanners 30, 32, 34, and 36 received on signal lines 50, 52, 54, and 56 respectively. The multiple intensity signals, which correspond to the feedback path of electronic subsystem 106 in FIG. 1, are used in a manner which is subsequently described to control the individual laser beam intensities.

After passing their associated scanners the exposed first, second, third, and fourth image areas are developed at first, second, third, and fourth development stations 60, 62, 64, and 66 respectively. In a discharged area development (DAD) system design, the first development station 60 advances negatively charged toner of a first color (black) onto the first image area, the second development station 62 advances negatively charged toner of a second color (cyan) onto the second image area; the third development station 64 advances negatively charged toner of a third color (yellow) onto the third image area; and the fourth development station 66 advances negatively charged toner of a fourth color (magenta) onto the fourth image area. The negative development material is attracted to the discharged (less negative) sections of the image areas and repelled by the more negative sections. The result is four colored toner images on the photoreceptor 10.

After being developed the toned image areas sequentially advance to a transfer station 70. Using any of a number of well known registration and transfer techniques, the individual colored toner images are superimposed to produce the desired full-color composite image which is transferred and permanently affixed to a substrate 72. After toner is transferred to the substrate 72, the image areas are cleaned of residual toner and other debris at a cleaning station 80 in preparation for the next imaging cycle.

The foregoing has generally described a single pass, four color electrophotographic printer which, like other designs, is suitable for incorporation of the present invention which is related to sensing and controlling the intensity of the laser beams from the laser diodes.

Figure 3:
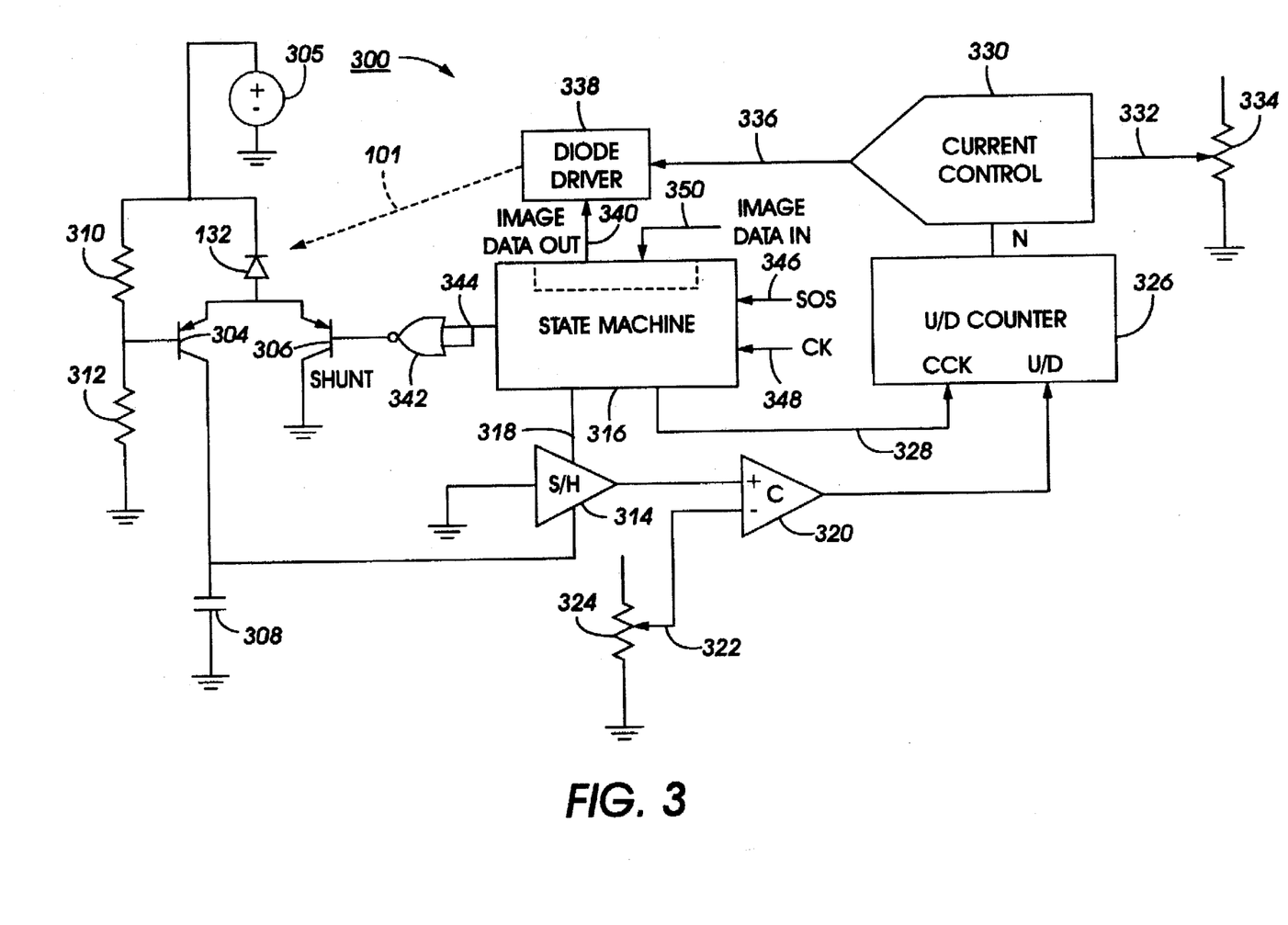
FIG. 3 schematically depicts a laser beam intensity sensor and controller according to the principles of the present invention.

FIG. 3 illustrates one embodiment of a beam intensity sensing and control network 300 which is in accord with the principles of the present invention. As shown, the network 300 includes a photodiode 132 which receives a portion of the output flux of laser diode 102, which is not shown in FIG. 3. The dashed arrow in FIG. 3 represents the portion of beam 101 emitted from the back facet of laser diode 102 and directed to photodiode 132, or a portion of beam 104 emitted from the front facet of laser diode 102 and directed to the photodiode 132. The cathode of the photodiode is connected to a DC voltage source 305 which provides reverse bias potential to the photodiode junction. The anode of the photodiode is connected to the emitters of transistors 304 and 306 which form a simple current switching network. Transistor 304 is biased such that when the base of transistor 306 is high (a logic "true" or positive potential), the current induced in photodiode 132 by the photons of beam 101 flows through from the emitter to the collector of transistor 304 and charges capacitor 308. The bias voltage for the base of transistor 304 is supplied by bias resistors 310 and 312.

Capacitor 308 serves as the storage capacitor for sample and hold circuit 314 which is controlled by state machine 316 (whose operation is described in more detail subsequently). When the sample/hold logic input 318 is true (hold), the sample and hold circuit buffers the potential on capacitor 308 for the non-inverting input of comparator 320. The analog input of the sample and hold circuit is grounded so that capacitor 308 remains discharged and the sample and hold circuit establishes an analog output of zero volts while the sample/hold logic input is false (sample). Comparator 320 compares the output voltage of sample and hold circuit 314 with the predetermined reference voltage 322 derived from potentiometer 324 and applied to the inverting input of the comparator.

Voltage 322 corresponds to the nominal analog voltage output of the sample and hold circuit under the conditions of optimum photoreceptor exposure. When the voltage on capacitor 308 exceeds the reference voltage 322, the comparator output is a logical false input to up-down counter 326 (U/D=down); conversely, when the voltage 322 exceeds the voltage on capacitor 308, the up-down input is a logical true (U/D=up).

Up-down counter 326, a bi-directional digital counter, also receives clocking pulses 328 from state machine 316. If the comparator output is false, a clocking pulse at the CK' input causes the up-down counter to decrement one unit, whereas if the comparator output is true, a clocking pulse at the CK' input causes the up-down counter to increment one unit.

The digital contents of the up-down counter 326 is applied to a current control circuit 330 shown as a digital to analog converter in FIG. 3. An analog voltage 332, which may be derived from a potentiometer 334, is also applied to the current control circuit. The analog voltage 332 sets the operating range of digital to analog converter 330 that supplies reference current 336 to diode driver 338. Up-down counter 326 controls the level of the reference current 336 dynamically within the operating range of current control circuit 330.

In addition to the level of reference current 336, diode driver 338 is also supplied image data from the state machine 316 via the path labeled 350 and 340 in FIG. 3. Diode driver 338 applies excitation current to a laser diode 102 (not shown in FIG. 3) when the image data logic input is at a predetermined state (say True). The amplitude of the laser excitation current is determined by the reference current 336, causing the laser diode to emit light flux at a specific level whenever the logic input is true. It will be apparent to those familiar with the electronic art that the requirement for very high bandwidth in the control system of FIG. 3 is limited to the laser diode driver 338 and the image data path 350 and 340 through state machine 316. Further, the portion of state machine 316 requiring high speed components to preserve the high data bandwidth may consist of as little as one logic gate contained in the portion outlined in dotted lines in FIG. 3. The gate serves to complete the high speed image data path between 350 and 340, or allows diode driver 338 to be modulated directly under the control of state machine 316.

Still referring to FIG. 3, the beam intensity sensing and control network 300 further includes a transistor driver 342 (shown in FIG. 3 as a NOR gate for simplicity) which conditions the logic output 344 from the state machine 316 to control the state of transistor 306. If transistor 306 is cut off, the current from photodiode 132 flows through from the emitter to the collector of transistor 304 and charges capacitor 308. If transistor 306 is in the conducting state, current from the photodiode 132 is instead shorted to ground.

The state machine receives start of scan pulses 346, machine clock pulses 348, and high speed image input data via path 350 from external logic circuitry which is not shown. The state machine clock pulses act to divide time into a sequence of convenient time periods which may be independent of, or derived from, a data clock. For example, a system data clock rate of 400 MHz could be divided by 40 to yield a 10 MHz clock for the state machine clock. Alternatively, if the data system clock is generated with a phase locked loop, the loop reference clock or a fraction or multiple thereof could be used for the state machine clock.

Because of the inherent laser beam geometries in rotating polygon ROS systems, each scan line period includes a portion of time in which the image area is written and a portion of time called the overscan in which the exposing spot is degraded and cannot be used for imaging. However, other activity can occur during overscan, such as measurement of the laser beam intensity.

The beam intensity sensing and control network 300 acts to dynamically maintain the light intensity from laser diode 102 at a predetermined value. If the laser diode power is below the prescribed level, i.e., the voltage from the sample and hold 314 is less than the reference voltage 322, the digital value contained the up-down counter is incremented causing the reference current 336 to increase, which in turn increases the amplitude of the laser excitation current and thus increases the intensity of the laser beam. Alternatively, if the laser diode output is too high, i.e., the voltage from the sample and hold 314 is greater than the reference voltage 322, the digital contents stored in the up-down counter is decremented, causing the reference current 336 to decrease, which in turn decreases the laser excitation current and thus the intensity of the laser beam.

A difference between a beam intensity sensing and control network which is in accordance with the principles of the present invention and prior art laser beam intensity sensing and control networks such as shown in FIG. 1, is that laser beam intensity is sensed during a time period which is greater than a scan line interval and is done in a manner which does not interfere with the production of the latent image. Therefore the laser beam being controlled is sensed for M pixel periods, and those M pixel periods do not all occur in one scan line interval. The present invention also utilizes the fast response of the laser diode source to define sharply delimited sample periods, rather than require fast response in the analog sensing and amplifier circuitry, which is a distinct advantage over prior art systems.

Many possibilities exist as to how the M pixel periods can can be arranged over more than one scan line interval. For example, in the preferred embodiment illustrated in FIGS. 3 and 4, the M pixel periods occur during the overscan portion of each scan which is outside the written image area.

A specific example may be helpful. Assume for purposes of discussion that each scan lasts for 10,000 pixel periods, of which 8,000 pixel periods occur in the image area and 2,000 pixel periods occur in non-imaged overscan areas (i.e., an 80% imaging duty cycle). Further assume that it has been determined that for a good balance between operating voltage levels, noise, and regulation response time, M should equal 6400, and that 400 of the 2,000 pixel periods which occur in the non-imaged areas are suitable to define the sampling period for each scan cycle. Therefore, after I=16 scan line intervals the laser will have been operated for exactly M=16×400=6,400 pixel periods during which induced photocharge has been collected on the storage capacitor. Since the net accumulated charge is a direct measure of the incident laser photon flux exposure, the laser intensity can be corrected as needed.

Another example of how the M pixel periods might occur in more than one scan line interval is if the number of written pixels is counted until a given accumulated charge level is reached. Then the total number of pixels M needed to be written over multiple cycles is compared with a standard number such that the laser diode reference current can be corrected. In principle, this method can be extended to include pixels written in the image area anywhere along the scan lines, as well as in the overscan area. However, this would require that counters and other circuitry be capable of high speed operation, precluding the use of primarily low speed circuitry as in the preferred embodiment. This method also has the disadvantage that it is more sensitive to uncertainties caused by leakage currents and variable quantum efficiency in the photodiode than the preferred method. Of course many other possibilities also exist as to how the M pixel periods can be arranged in the raster and overscan areas.

Figure 4:
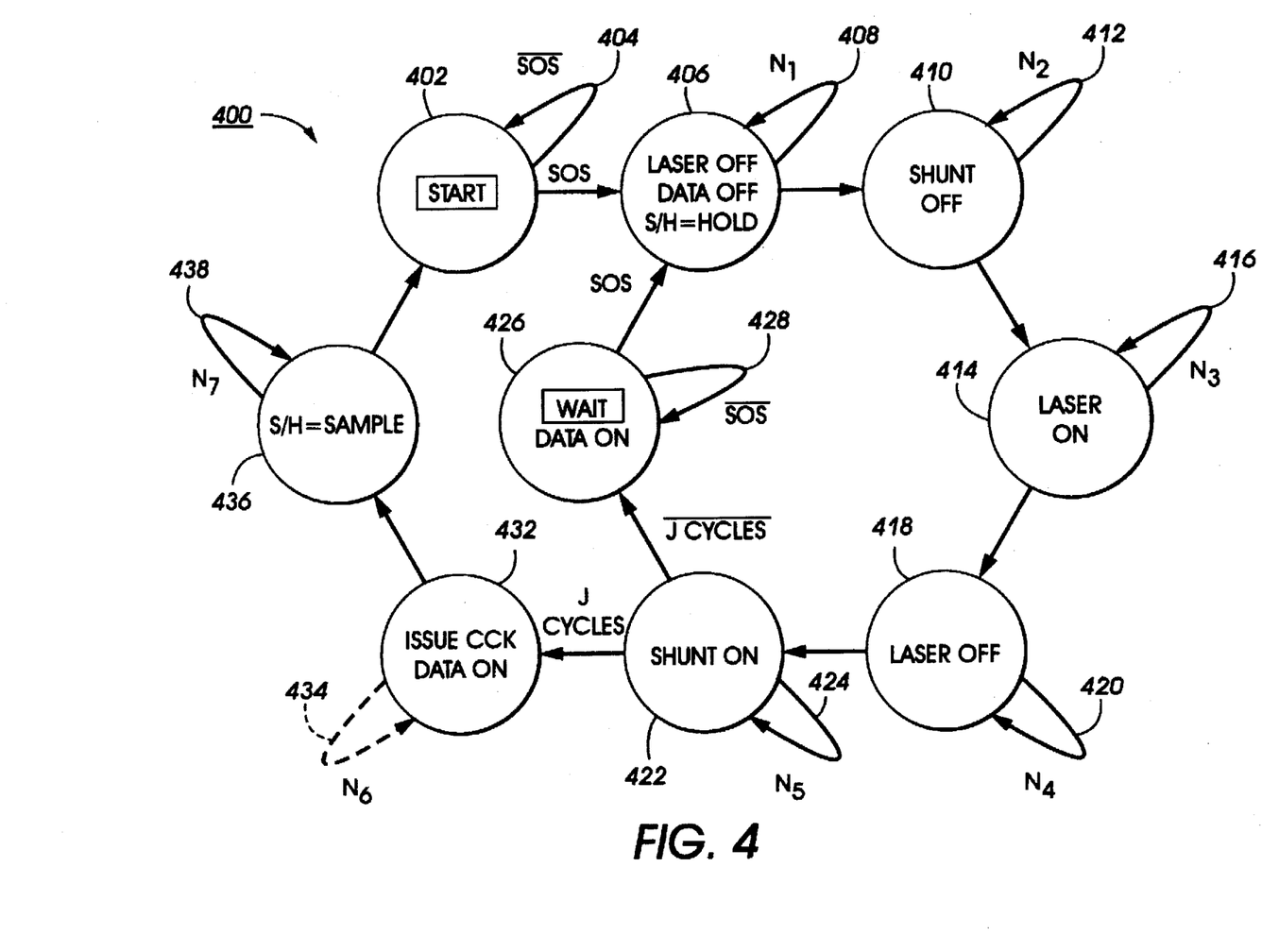
FIG. 4 is a state diagram of the operation of the laser beam intensity sensor and controller depicted in FIG. 3.

FIG. 4 presents a state diagram 400 which is a flow chart useful for explaining the operation of the beam intensity sensing and control network 300 illustrated in FIG. 3. In the arrangement of FIG. 3, the sensing and control network accumulates charge on the capacitor only in the non-imaged pixel periods immediately following the SOS pulse. From the start state, the state machine 316 loops via path 404 until the start of scan (SOS) input 346 goes true. In the start state the laser diode responds to image data and is normally illuminated to enable the start of scan to be detected, At the same time, the sample and hold circuit maintains capacitor 308 in the fully discharged condition with input 318 false (sample), a consequence of having previously passed through state 436. A start of scan pulse indicates that the focussed laser spot has advanced to a known position at the beginning of the scan line. When the start of scan pulse goes true, the state machine 316 proceeds to state 406 where the high speed image path is blocked, the laser diode is held off, and the sample/hold logic input 318 is made true (hold) so that capacitor 308 is no longer discharged by sample and hold circuit 314. Additionally, transistor 306 is in the conductive state (from a previous cycle) to bypass any photodiode leakage current.

The state machine 316 remains in state 406 for one or more (N1) machine clock cycles shown by loop 408. The delay of N1 clock cycles gives the sample and hold circuit 314 time to stabilize in an initial state with the discharge path removed and zero initial charge on capacitor 308. After a delay of N1 clock cycles, the state machine advances to state 410 where transistor 306 is put in the non-conductive state and allowed to stabilize. The state machine 316 remains in state 410 for N2 clock cycles indicated by loop 412 and advances to state 414. The choice of N1 and N2 will depend on the time delays needed for circuit stabilization compared with the machine clock period. For example, if the machine clock is 10 MHz and a delay of 3 microseconds is needed for transistor 306 to switch to the nonconductive state and stabilize before the next step is initiated, a value of 30 might be selected for loop N2.

In state 414, laser diode 102 is excited for N3 machine clock periods indicated by loop 416. The time of operation in state 414 delimits the sample period, where the laser diode is delivered excitation current resulting in photons incident on photodiode 132 that generate photocharge collected on capacitor 308. The sample period is understood to occur before the focussed spot has progressed far enough along the scan line to reach the active image area. After N3 machine clock periods, state machine 316 advances to state 418 where the laser diode excitation is removed, but transistor 306 is maintained in the non conducting state to allow time for substantially all of the photo-induced charge in photodiode 132 to migrate to capacitor 308. Essentially, N4 clock cycles is a time delay designed to compensate for the natural relaxation time of photodiode 132. Looked at another way, the laser is excited for a period defined by N3, and emits light (after a very short initial delay) for a period roughly equal to N3. The laser generated photon flux creates hole-electron charge carriers within the active volume of photodiode 132 which diffuse through the photodiode structure and accumulate on capacitor 308. If the photodiode area is large, the delay can be appreciable. Therefore, N3+N4 machine clock periods are provided to collect all the photocharge generated by a burst of light lasting for only N3 machine clock periods.

After N4 clock cycles all the available photocharge has accumulated on capacitor 308 and the state machine advances to state 422 where transistor 306 is switched to the conducting state. This provides a path to ground and prevents charge generated during subsequent exposure of the image area from reaching capacitor 308. At this time the focussed spot has progressed far enough, along the scan line that it is out of range of the SOS detector but has not yet reached the edge of the photoreceptor image area.

In state 422 the state machine branches to state 426 or 432 depending on whether the predetermined number of J accumulation cycles have been completed. If the capacitor has not accumulated charge for J cycles, the state machine advances to state 426.

In state 426 the state machine unblocks the high speed image data path to the laser diode and waits for the next start of scan signal. When the start of scan signal goes true, the state machine advances once again to state 406 then through states 406, 410, 414, 418 and 422 as previously described.

Thus capacitor 308 receives and accumulates the photocharge generated in the photodiode as a result of the laser diode being excited for a period of N3 machine clocks during each scan cycle. However, if the prescribed number of J cycles have been completed, the state machine instead advances from state 422 to state 432. The delay loop 424 in state 422 for N5 machine clocks provides time for the analog voltage output of sample and hold circuit 314 to settle and the comparator 320 output to stabilize at a well defined logic level before state 432 is entered.

In state 432 the state machine supplies a single logic transition to the clock input CK' of up-down counter 326, unblocks the high speed image data path to the laser diode, and proceeds to state 436 on the next machine clock pulse.

As a result of the CK' logic transition in state 432, the up-down counter 326 is either incremented or decremented by one unit depending on the output condition of comparator 320. The change modifies the level of reference current 336 supplied to diode driver 338, and therefore the excitation current applied to the laser diode. In state 436 the sample and hold logic input 318 is switched to false (sample), discharging capacitor 308 through sample and hold circuit 314 and reestablishing an analog output of zero volts while the sample/hold logic input remains false. If storage capacitor 308 is relatively large, the time required for complete discharge could be several machine clock cycles. The loop 438 for N7 clock cycles in state 436 ensures that a new measurement cycle does not begin until capacitor 308 is completely discharged. The state machine then returns to start state 402 and waits for the SOS input to turn true thereby initiating the next iteration.

It will be clear to those experienced in the electronic art that under some conditions, a single central state machine can support an architecture similar to that in FIG. 2 having several ROS systems being operated in parallel. The same sequence of steps is shared by all measurement subsystems in a multiple color machine so that four sample and hold circuits, four up-down counters, four current control circuits, and four transistor shunt circuits, as well as four data gates can all be controlled with one state machine, providing the sample periods can be made to coincide. This is typically the case where a single polygon serves multiple laser beams, or individual ROS scanners are closely synchronized to provide precision registration.

In another embodiment of the present invention, a common photodiode element can be configured to detect light flux from a plurality of laser diode sources, such as the commercially available "dual" and "quad" devices typically housed in a single hermetically sealed package. In this case the photocurrent switching network in FIG. 3, comprised of transistors 304 and 306 with appropriate biasing, is replaced by a plurality of switchable current paths that conduct photocurrent generated in a common photodiode element to an array of charge storage capacitors equivalent to capacitor 308 in FIG. 3. In this arrangement, each laser diode is individually excited and the resultant photocurrent switched to its corresponding capacitor. The individual laser diode sources can then be controlled with a state machine analogous to that of FIG. 4, where each laser diode is sampled over a span of several scan lines, with the multiple laser diodes being regulated in sequence. Alternately, the available sampling time N3 can be subdivided into a series of shorter periods where the laser diodes are excited in an interlaced or time-shared fashion during the scans, and adjustments to the excitation currents are all made simultaneously at the end of J cycles.

Operating the beam intensity sensing and control network 300 (see FIG. 3) according to the state flow diagram 400 (see FIG. 4) is advantageous in that the pixel periods in which the laser beam is excited occurs over a time period in which a plurality of scan lines are written, yet the sensing and control of the laser beam intensity and the writing of the scan lines are mutually independent. It should be noted that it would be beneficial if the the up-down counter in FIG. 3 were always initiated in a condition of the lowest possible laser excitation at startup, i.e., when the machine is first turned on. The system could then be brought into equilibrium at an accelerated rate by issuing a plurality of logic transitions to the clock input CK' of up-down counter 326 when state 432 is reached, as indicated by loop 434 of value N6 shown dotted in FIG. 4. Those who are skilled in the applicable arts will recognize numerous other modifications and adaptations of the illustrated embodiment which are also in accord with the principles of the present invention. Therefore, the present invention is not to be limited except by the pending claims.

What is claimed:

1. A raster output scanning station comprised of:

a time base generator for generating a sequence of pixel periods;

a laser diode for emitting a laser beam, comprised of a first portion and of a second portion, in response to a laser drive current such that the intensities of said first portion and of said second portion are functions of the laser drive current;

a drive circuit receiving both a drive signal and a current control signal, said drive circuit for applying laser drive current to said laser diode in pixel periods selected by the drive signals and at a magnitude which is a function of the current control signal;

a raster scanner for sweeping the first portion of the laser beam in scan lines, wherein the scan line interval time which is to N pixel periods;

a controller for applying a set of M drive signals to the drive circuit, wherein the M drive signals occurs over a number of pixel periods which is greater than N;

a photosensor illuminated by the second portion of the laser beam, said photosensor for generating a charge current derived from the set of M drive signals, wherein the charge current is dependent upon the beam intensity of the second portion of the laser beam;

a capacitor for receiving the generated charge current and for producing a capacitor voltage from the received generated charge current;

a comparator for comparing the capacitor voltage with a predetermined value and for producing a comparator signal based upon that comparison, wherein the comparison occurs after the set of M selected pixel periods is completed; and a current control circuit for receiving the comparison signal and for adjusting the current control signal based on the comparison signal such that the intensity of the second part of the beam moves toward a predetermined intensity.

2. The raster output scanning station according to claim 1, wherein the second portion of the laser beam is emitted from a back facet of the laser diode.

3. The method according to claim 1 wherein the first portion of the laser beam sweeps across a surface.

4. A printing machine, comprising:

a photoreceptive surface;

a charging station for charging said photoreceptive surface to a predetermined potential;

a first exposure station for exposing said photoreceptive surface to produce a first electrostatic latent images on said photoreceptive surface, said first exposure station being comprised of:

a time base generator for generating a sequence of pixel periods;

a laser diode for emitting a laser beam, comprised of a first portion and of a second portion, in response to a laser drive current such that the intensities of said first portion and of said second portion are functions of the magnitude of the laser drive current;

a drive circuit receiving both drive signals and a current control signal, said drive circuit for applying laser drive current to said laser diode in pixel periods selected by the drive signals and at a magnitude which is a function of the current control signal;

a raster scanner for sweeping the first portion of the laser beam from a start of scan position, across the photoreceptive surface, and back to the start of scan position in a scan line interval time of N pixel periods;

a controller for applying a first set of drive signals to the drive circuit in response to video information such that a first latent image is produced on the photoreceptive surface, said controller further for applying a second set of M drive signals in M pixel periods to the drive circuit, wherein the M pixel periods occurs over a number of pixel periods which is greater than N;

a photosensor illuminated by the second portion of the laser beam, said photosensor for generating a charge current from the M pixel periods, wherein the generated charge current is dependent upon the beam intensity of the second portion of the laser beam;

a capacitor for receiving the generated charge current and for producing a capacitor voltage from the received generated charge current;

a comparator for comparing the capacitor voltage with a predetermined value and for producing a comparator signal based upon the comparison, wherein the comparison occurs after the second set of M pixel periods; and a current control circuit for receiving the comparison signal and for adjusting the current control signal based on the comparison signal such that the intensity of the second part of the beam moves toward a predetermined intensity;

a first developing station for depositing developing material of a first color on said first electrostatic latent image so as to produce a first toner image on said photoreceptive surface;

a transfuser member for transferring the first toner image onto a substrate; and a cleaning station for removing residual debris from the photoreceptive member.

5. The printer according to claim 4 wherein the second portion of the laser beam is emitted from a back facet of the laser diode.

6. The printer according to claim 4, wherein the capacitor is not charged when the latent image is produced.

7. The printer according to claim 4, further including a second exposure station for exposing said photoreceptive surface to produce a second electrostatic latent images on said photoreceptive surface, and a second developing station for depositing developing material of a second color on said second electrostatic latent image.

8. A method of controlling the intensity of a laser beam on a photoreceptive surface, the method comprising the steps of:

identifying a sequence of pixel periods;

applying a laser drive current to a laser diode in a first set of selected pixel periods so as to emit a laser beam;

sweeping a first part of the emitted laser beam from a start of scan position, across a photoreceptive surface, and back to the start of scan position in a scan line interval time which is equal to N pixel periods;

illuminating a photosensor with a second part of the emitted laser beam and generating a charge current from a second set of M pixel periods, wherein the charge current is dependent upon the beam intensity of the second part of the laser beam;

charging a capacitor with the generated charge current so as to create a capacitor voltage;

comparing the capacitor voltage with a predetermined value after the second set of M selected pixel periods, wherein the second set of M selected pixel periods requires more than a scan line interval time to occur;

adjusting the laser drive current such that the intensity of the second part of the beam moves toward a predetermined intensity.

9. The method according to claim 8 wherein the second part of the laser beam is emitted from the back facet of the laser diode.

10. The method according to claim 8 wherein the photoreceptive surface is a charged photoreceptive member having an image area, and wherein the first part of the laser beam is modulated in accordance with image information so as to produce a latent image on the image area.

11. The method according to claim 10, wherein the capacitor is not charged when the latent image on the image area is produced.

* * * * *